US006093241A

United States Patent [19]
Alther

[11] Patent Number: 6,093,241
[45] Date of Patent: Jul. 25, 2000

[54] GRANULAR ORGANOCLAY FOR HIGH TEMPERATURE APPLICATIONS

[75] Inventor: George R. Alther, Ferndale, Mich.

[73] Assignee: Biomin, Inc., Ferndale, Mich.

[21] Appl. No.: 09/264,253

[22] Filed: Mar. 8, 1999

[51] Int. Cl.[7] .............................. C04B 14/00; C09D 1/42
[52] U.S. Cl. ........................ 106/719; 106/694; 106/803
[58] Field of Search ................................... 106/719, 694, 106/803

[56] References Cited

U.S. PATENT DOCUMENTS 5,028,338  7/1991  Hooykaas ................................. 210/679

OTHER PUBLICATIONS

Chemical Abstract No. 115:78073, abstract of an article by Montgomery et al entitled "Optimization of cement–based . . . using organophilic clays", Waste Manage. Res. 9(1), pp. 21–34, 1991, No Month.

Primary Examiner—Anthony Green
Attorney, Agent, or Firm—Young & Basile

[57] ABSTRACT

Certain wastewater streams coming out of boilers have temperatures higher than 180° Fahrenheit. Organoclay granules where a quaternary amine acts as a binder will dissolve at that temperature. A cementitious binder is used to pelletice an organoclay made of sepiolite to overcome this problem.

11 Claims, No Drawings

GRANULAR ORGANOCLAY FOR HIGH TEMPERATURE APPLICATIONS

BACKGROUND OF THE INVENTION

1. Field of the Invention

This invention is related to organoclays, particularly those useful in high temperature applications.

2. Discussion of Relevant Art

Granular organoclays (organically modified clays), have found use in a variety of applications such as clean-up of ground water and wastewater. Granular organoclays are used as pre-polishers for activated carbon or as post polishers for oiltwater separators.

An organically modified clay is a bentonite or other type clay, modified with quaternary amines as outlined in U.S. Pat. No. 2,531,440 to Jordan. Certain quaternary amines consist of a paste or a solid, and will not melt until a temperature of about 175° Fahrenheit is reached. The quaternary amine acts as a binder for the organoclay, if the organoclay is made by the dry method and forced through a die plate of an extruder. The quaternary is first melted, mixed with the bentonite, extruded, and upon cooling, it re-precipitates. The extrudate becomes very hard and can be granulated. When the temperature exceeds 175° Fahrenheit, the quaternary amine will melt and no longer bind the clay, therefore the granules fall apart.

Various binders are used in industry for granulation. Activated carbon granules are bound by phenolic resins as disclosed in U.S. Pat. No. 5,389,325 to Bookinder. A good background of binders is found in the foundry industry. Numerous patents are mentioned in U.S. Pat. No. 4,357,165 Helferich. These include the use of alumino silicate. Other binders are magnesium chloride/magnesium oxide solutions which are rigid and become harder as time passes as disclosed in U.S. Pat. No. 3,956,900 to Klinker. Other binders are lignosulfonates (U.S. Pat. No. 4,306,912). U.S. Pat. No. 4,207,116 to Been describes binding sodium bentonite with cement and water. Gypsum and binders such as sodium silicates are also in use.

SUMMARY OF THE INVENTION

The present invention is directed to a temperature resistant organically modified clay and a method for making the same. The modified organic clay of the present invention comprises an organic clay material; a quaternary compound; and a cementitious binder. The clay material is, preferably, selected from the group consisting of sepiolite, attapulgite, and mixtures thereof.

DESCRIPTION OF THE PREFERRED EMBODIMENT

This invention is predicated on the unexpected discovery that an organically modified clay, preferably in granular form, can be prepared which is stable at elevated temperatures. Organically modified clays of the present invention are stable at temperatures in excess of 175° C.

This invention relates to organically modified clay granules and the method of making them. In the organic clay of the present invention, a base clay having a water absorption capacity lower than that of bentonite-based materials is employed. The method involves first of all, changing the base clay. Tests showed that as long as a bentonite, particularly a sodium bentonite is used, the granules will break up at higher temperatures regardless of the binder. This is due to the high water absorption capacity of sodium bentonite. Upon reaching the boiling point, the water exerts hydraulic pressure on the clay particles which overcome the force of the binder.

The modified organic clay of the present invention employs a material as the clay component which is essentially non-absorbent and can be characterized by a needle-like structure. The clay material employed in the composition of the present invention is a non-bentonite clay material which is selected from the group consisting of sepiolite, attapulgite, and mixtures thereof. The clay material of choice may be a sepiolite clay, also called palygorskite, which has a needle like structure and which does not adsorb water per se. Materials such as attapulgite as well as sepiolite are also useful as the clay component of the present invention. These materials are, preferably, present as granules.

The clay component of the present invention is an organic clay and is present in an amount in a range between approximately 5% to approximately 95%. As used herein the term "organoclay" is taken to mean organically modified clays. In the present invention, organoclays are prepared by combining the chosen clay with a quaternary compound. The quaternary compound is, preferably selected from the group consisting of quaternary amine and quaternary pyridium.

The composition of the present invention also includes a cementitious binder. The cementitious binder employed is one capable of pelletizing the organoclay described previously. The cementitious binder employed in the composition of the present invention is present in an amount between approximately 5% and approximately 95% of the composition.

The cementitious binder employed in the present invention may comprise Portland cement, a calcium aluminate-type cement. The cementitious binder may also comprise materials such as hydraulic lime, pozzalan, calcium silicate or a gypsum compound with an alpha gypsum mehihydrate being preferred.

The composition of the present invention may also contain a hardening agent. The hardening agent of choice is selected from the group consisting of $NaSiO_2$, $NaCO_3$, and phosphate compounds.

In order to prepare the novel granular organoclay of the present invention, an organoclay material containing a quaternary compound selected from the group consisting of quaternary pyridinium and quaternary amine, and a clay selected from the group consisting of sepiolite, attapulgite, and mixtures thereof is prepared. A cementitious binder is added to an aqueous composition containing the organoclay to form a cement bound organoclay. When placed in water at temperatures of 330° F. the organoclay granules remain stable under high temperature conditions.

COMPARATIVE EXAMPLE

Granules of bentonite were prepared, allowed to dry, and placed into water. The water was then heated to boiling. If the granules fell apart, the binder was discarded. Finally, ordinary cement was added, which held the particles together at high temperatures. Upon boiling of the water, however, the cements strength was overcome by the hydraulic forces exerted by the boiling water that is absorbed onto the bentonite, which pries the granules apart. This did not happen with sepiolite when the process was tried with that material.

Example

Granules of a cement bound sepiolite organoclay prepared according to the method outlined in Example I were then placed into water and the mixture placed into a pressure bomb. These steel bonbs are used to test the integrity of diesel fuel based drilling mud. The water was heated to 330° Fahrenheit. While there was some decay of granules, probably due to poor mixing of the clay blend, the bulk of granules remained in tact. This proved that sepiolite based cement bound organoclay granules and remained stable under high temperature conditions, making them useful for removal of oil from boiler water.

What is claimed:

1. A temperature resistant modified organic clay composition, said modified organic clay composition comprising:
   a clay material, said clay material being stable in water and selected from the group consisting of sepiolite, attapulgite, and mixtures thereof;
   a quaternary compound selected from the group consisting of quaternary amines, quaternary pyridiniums, and mixtures thereof; and
   a cementitious binder; wherein said clay material and said quaternary compound are present as an organically modified clay, and wherein said organically modified clay and said cementitious binder are present in amounts sufficient to provide a granular compound stable at temperatures of greater than 175 degrees F., and wherein said organically modified clay;
   wherein the amount of said cementitious binder ranges from approximately 95% to approximately 5% and the amount of said clay material and said quaternary compound, together, ranges from approximately 5% to approximately 95%.

2. A composition as in claim 1, wherein said cementitious binder comprises Portland cement.

3. A composition as in claim 1, wherein said cementitious binder comprises calcium/aluminate cement.

4. A composition as in claim 1, wherein said cementitious binder comprises hydraulic lime.

5. A composition as in claim 1, wherein said cementitious binder comprises pozzalan.

6. A composition as in claim 1, wherein said cementitious binder comprises calcium silicate.

7. A composition as in claim 1, wherein said cementitious binder comprises a gypsum compound.

8. A composition as in claim 1, wherein said composition further comprises a hardening agent selected from the group consisting of $NaSiO_2$ and $NaCO_3$.

9. A composition as in claim 8, wherein said hardening agent comprises $NaSiO_2$.

10. A composition as in claim 8, wherein said hardening agent comprises $NaCO_3$.

11. A composition as in claim 1, wherein said clay material is selected from the group consisting of sepiolite, attapulgite, and mixtures thereof.

* * * * *